(12) United States Patent
Matsui

(10) Patent No.: US 7,511,898 B2
(45) Date of Patent: Mar. 31, 2009

(54) ZOOM LENS AND IMAGING DEVICE

(75) Inventor: Takumi Matsui, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 12/078,601

(22) Filed: Apr. 2, 2008

(65) Prior Publication Data

US 2008/0252994 A1    Oct. 16, 2008

(30) Foreign Application Priority Data

Apr. 11, 2007    (JP) ............................. 2007-104042

(51) Int. Cl.
- G02B 9/62 (2006.01)
- G02B 13/18 (2006.01)
- G02B 21/02 (2006.01)

(52) U.S. Cl. ...................... 359/758; 359/756; 359/757; 359/713; 359/658

(58) Field of Classification Search ................ 359/658, 359/680, 682, 683, 676, 695, 713, 752, 756–758; 396/72, 75, 79
See application file for complete search history.

(56) References Cited

U.S. PATENT DOCUMENTS

| | | | | |
|---|---|---|---|---|
| 4,812,024 A | * | 3/1989 | Mukaiya | 359/683 |
| 5,136,430 A | * | 8/1992 | Hamanishi | 359/676 |
| 5,548,445 A | * | 8/1996 | Yahagi | 359/677 |
| 7,218,456 B2 | * | 5/2007 | Obama | 359/683 |
| 7,312,931 B2 | * | 12/2007 | Sano et al. | 359/683 |

FOREIGN PATENT DOCUMENTS

JP    2006-071993 A    3/2006

* cited by examiner

Primary Examiner—Loha Ben
(74) Attorney, Agent, or Firm—Rader, Fishman & Grauer PLLC; Ronald P. Kananen

(57) ABSTRACT

A zoom lens includes, in sequence from an object side to an image side along an optical axis, first to sixth lens groups respectively having positive, negative, positive, positive, negative, and positive refracting powers. The first lens group includes a reflecting member for bending the optical axis by substantially 90 degrees. The first and third lens groups remain stationary on the optical axis when the zoom lens zooms or focuses. Zooming is performed by moving the second, fourth, and fifth lens groups along the optical axis. Focusing is performed by moving the fourth lens group and/or the fifth lens group along the optical axis. Image shift is performed by moving the sixth lens group in a direction substantially perpendicular to the optical axis. The fourth lens group includes a single positive lens and a single negative lens.

8 Claims, 5 Drawing Sheets

ZOOM LENS AND IMAGING DEVICE

CROSS REFERENCES TO RELATED APPLICATIONS

The present invention contains subject matter related to Japanese Patent Application JP 2007-104042 filed in the Japanese Patent Office on Apr. 11, 2007, the entire contents of which are incorporated herein by reference.

BACKGROUND OF THE INVENTION

1. Field of the Invention

The present invention relates to a novel zoom lens and imaging device, and more specifically, to a technology for increasing the zoom ratio of a zoom lens using a so-called bending optical system to reduce the thickness in the direction of the optical axis of the incident light.

2. Description of the Related Art

In recent years, imaging devices such as digital still cameras, which use solid-state imaging elements, have become popular. As digital still cameras become popular, they are expected to have a higher image quality. Demands are growing for digital still cameras having a particularly large number of pixels to have lenses for taking pictures, in particular, zoom lenses, having a good imaging performance to be used with solid-state imaging elements having a large number of pixels. Further, digital still cameras are expected to be small. Accordingly, compact and high-performance zoom lenses are desired. Some cameras have been further reduced in thickness by using a prism disposed between lenses to bend the optical axis of the optical system.

In addition, demands for a higher zoom ratio are strong. However, an increase in zoom ratio leads to degradation in image quality due to hand shake, which results from unstable holding of a thin camera.

Japanese Unexamined Patent Application Publication No. 2006-71993 discloses a zoom lens including five lens groups, namely, positive, negative, positive, positive, and negative lens groups, arranged in sequence from the object side to the image side. In the zoom lens disclosed therein, a fifth lens group is divided into two subgroups, namely, a negative lens subgroup and a positive lens subgroup. The positive lens subgroup is moved in a direction substantially perpendicular to the optical axis to shift images.

SUMMARY OF THE INVENTION

The zoom lens disclosed in Japanese Unexamined Patent Application Publication No. 2006-71993 has a zoom ratio of about 3×, failing to meet the demands for a higher zoom ratio. To increase the zoom ratio of this zoom lens, second and fourth lens groups have to be moved by larger amounts. This inevitably increases the size of the zoom lens in the optical axis direction.

It is desirable to increase the zoom ratio of a zoom lens to at least 5×, without increasing the size of the zoom lens in the optical axis direction.

According to an embodiment of the present invention, there is provided a zoom lens including, in sequence from an object side to an image side along an optical axis, a first lens group having a positive refracting power, a second lens group having a negative refracting power, a third lens group having a positive refracting power, a fourth lens group having a positive refracting power, a fifth lens group having a negative refracting power, and a sixth lens group having a positive refracting power. The first lens group includes a reflecting member for bending the optical axis by substantially 90 degrees. The first and third lens groups remain stationary on the optical axis when the zoom lens zooms or focuses. Zooming is performed by moving the second, fourth, and fifth lens groups along the optical axis. Focusing is performed by moving the fourth lens group and/or the fifth lens group along the optical axis. Image shift is performed by moving the sixth lens group in a direction substantially perpendicular to the optical axis. The fourth lens group includes a single positive lens and a single negative lens.

An imaging device according to an embodiment of the present invention includes the above-described zoom lens and an imaging element for converting an optical image created by the zoom lens into an electric signal.

The present invention can increase the zoom ratio of a zoom lens to at least 5×, without the necessity of increasing the size of the zoom lens in the optical axis direction.

DESCRIPTION OF THE PREFERRED EMBODIMENTS

Figure 1:
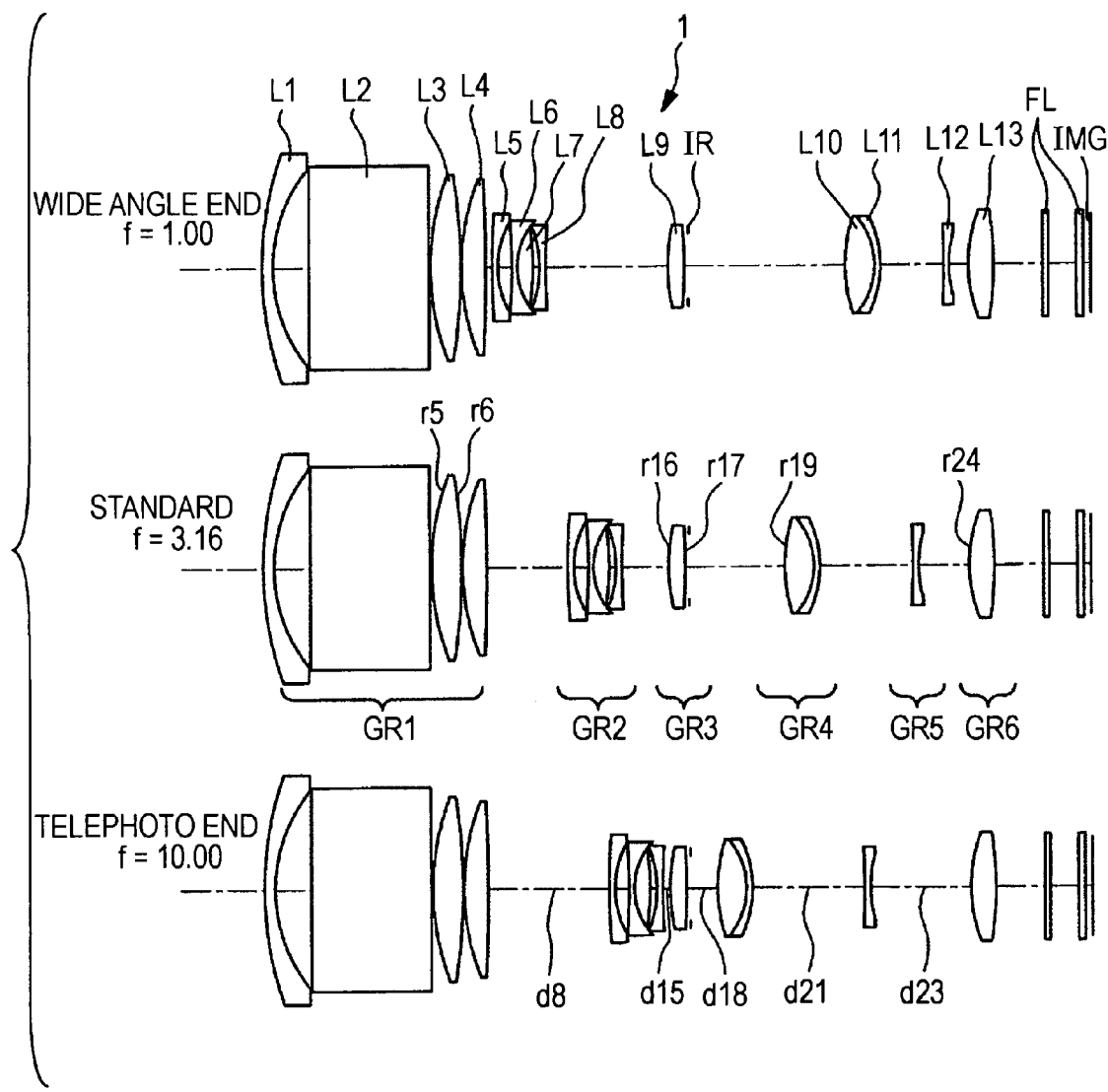
FIG. 1 shows a configuration of a zoom lens according to a first embodiment of the present invention.

Preferred embodiments of a zoom lens and imaging device of the present invention will now be described with reference to the drawings.

A zoom lens according to an embodiment of the present invention includes, in sequence from an object side to an image side along an optical axis, a first lens group having a positive refracting power, a second lens group having a negative refracting power, a third lens group having a positive refracting power, a fourth lens group having a positive refracting power, a fifth lens group having a negative refracting power, and a sixth lens group having a positive refracting power. The first lens group includes a reflecting member for bending the optical axis by substantially 90 degrees. The first and third lens groups remain stationary on the optical axis when the zoom lens zooms or focuses. Zooming is performed by moving the second, fourth, and fifth lens groups along the optical axis. Focusing is performed by moving the fourth lens group and/or the fifth lens group along the optical axis. Image shift is performed by moving the sixth lens group in a direction substantially perpendicular to the optical axis. The fourth lens group includes a single positive lens and a single negative lens.

A zoom lens according to an embodiment of the present invention can increase the zoom ratio to at least 5×, without increasing the size of the zoom lens in the optical axis direction.

By moving the fifth lens group when the zoom lens zooms, a greater zoom effect can be obtained without increasing the amounts of movements of the second and fourth lens groups. Thus, even if the zoom ratio of the zoom lens is increased to a zoom ratio of larger than 5×, for example, about 7× to 10×, the size of the zoom lens in the optical axis direction does not increase. In other words, by independently moving three lens groups, namely, the second, fourth, and fifth lens groups, a zoom effect greater than a zoom effect obtained by moving only two lens groups can be obtained. In addition, fluctuations of aberrations occurring when the zoom lens zooms can be suppressed. Accordingly, a compact and high-performance zoom lens having a high zoom ratio can be realized.

Focusing may be performed by moving the fourth lens group towards the object side, or by moving the fifth lens group towards the image side. Focusing may also be performed by moving the fourth and fifth lens groups simultaneously.

Because the fourth lens group is moved when the zoom lens zooms or focuses, it desirably includes a small number of lenses. By making the fourth lens group include a single positive lens and a single negative lens, the size and weight of the fourth lens group can be reduced. This enables a driving mechanism for moving the fourth lens group to be compact, thereby contributing to a reduction in size of the zoom lens.

By disposing the fifth lens group having negative refracting power in front of (on the object side of) a sixth lens group serving as a hand-shake compensation lens, rays passing through the outer portions of an image diverge at the fifth lens group. The sixth lens group then makes the rays telecentric. This allows the lenses of the first lens group, in particular, the lens closest to the object side, to have a smaller diameter, enabling the entire zoom lens to be compact.

When performing hand-shake compensation by moving lens groups in the direction perpendicular to the optical axis, fluctuations of aberrations, in particular, fluctuation of distortion, are problematic. The number of lenses has had to be increased to correct such fluctuations of aberrations. However, because the zoom lens according to an embodiment of the present invention performs hand-shake compensation using the sixth lens group, which makes the rays telecentric as described above, fluctuations of aberrations are small. Thus, a high optical performance may be maintained without increasing the number of lenses.

The first lens group, which is positioned closest to the object side, includes a prism. The prism bends the optical axis of imaging rays by 90 degrees right after the imaging rays enter the lens. This reduces the size of the zoom lens in the direction of the optical axis of the incident light, i.e., the thickness of the zoom lens. Accordingly, an imaging device having this zoom lens can be made thinner.

In the zoom lens according to an embodiment of the present invention, it is preferable that the first lens group include, in sequence from the object side to the image side along the optical axis, a negative lens, a prism having a reflecting surface for bending the optical axis by 90 degrees, a first positive lens, and a second positive lens. At least one of the first and second positive lenses is preferably an aspheric lens.

In the zoom lens according to an embodiment of the present invention, it is preferable that the second lens group include, in sequence from the object side to the image side along the optical axis, a first negative lens, a cemented lens including a negative lens and a positive lens, and a second negative lens.

The second lens group can be configured to have the largest refracting power among the lens groups that are moved when the zoom lens zooms. By making the second lens group include, in sequence from the object side to the image side along the optical axis, the first negative lens, the cemented lens including the negative lens and the positive lens, and the second negative lens, generation of aberrations in the second lens group and fluctuations of aberrations occurring when the zoom lens zooms can be suppressed.

In the zoom lens according to an embodiment of the present invention, it is preferable that the third lens group include an aperture stop and a single positive lens disposed adjacent to the aperture stop.

In the zoom lens according to an embodiment of the present invention, it is preferable that the fourth lens group include a cemented lens including a positive lens and a negative lens.

Such a structure of the fourth lens group makes a minimum structure for correcting off-axis monochromatic and chromatic aberrations. The positive lens preferably has an aspheric surface adjacent to the object side.

In the zoom lens according to an embodiment of the present invention, it is preferable that the fifth lens group include a single negative lens.

Because the fifth lens group is moved when the zoom lens zooms or focuses, it desirably includes a small number of lenses. By making the fifth lens group include a single negative lens, the size and weight of the fifth lens group can be reduced. This enables a driving mechanism for moving the fifth lens group to be compact, thereby contributing to a reduction in size of the zoom lens.

In the zoom lens according to an embodiment of the present invention, it is preferable that the sixth lens group include a single positive lens.

By making the sixth lens group, which serves as a shift lens group used to compensate for hand shake, include a single lens, a driving mechanism for driving the sixth lens group in the direction perpendicular to the optical axis can be made compact. This contributes to a reduction in size of the entire zoom lens, and also contributes to speeding up of the driving mechanism and a reduction in cost of fabricating the driving mechanism.

Now, a zoom lens according to a specific embodiment and a first numerical example, in which numerical values are applied to the zoom lens according to the first embodiment, of the present invention will be described with reference to the drawings and tables.

The aspheric shape described in the following embodiment may be defined by the following Expression 1.

$$Z = \frac{C \cdot H^2}{1 + \sqrt{1 - (1+K) \cdot C^2 \cdot H^2}} + \sum A^{2i} \cdot H^{2i} \qquad \text{[Expression 1]}$$

In Expression 1, "Z" represents the distance in the optical axis direction between the tangent plane at the top of the aspheric surface and the aspheric surface at the height "H" $(=\sqrt{(X^2+Y^2)})$ from the optical axis; "C" represents the curvature (1/r) of the top of the aspheric surface; "K" represents the conic constant; and "A2i" represents the 2i-th-order aspheric coefficient.

FIG. 1 shows a configuration of a zoom lens according to a first embodiment of the present invention, in which, from above, positions of the lens groups along the optical axis when the zoom lens is at the wide angle end, positions of the lens groups along the optical axis when the zoom lens is at the standard focal length, and positions of the lens groups along the optical axis when the zoom lens is at the telephoto end, are shown.

A zoom lens 1 includes, in sequence from the object side to the image side, a first lens group GR1 having a positive refracting power, a second lens group GR2 having a negative refracting power, a third lens group GR3 having a positive refracting power, a fourth lens group GR4 having a positive refracting power, a fifth lens group GR5 having a negative refracting power, and a sixth lens group GR6 having a positive refracting power. The third lens group GR3 includes an aperture stop IR on the image side. A filter group FL including a low-pass filter, such as an infrared cut filter, is disposed between the sixth lens group GR6 and an image plane IMG.

When the zoom lens 1 zooms, the first lens group GR1, the third lens group GR3, and the sixth lens group GR6 remain stationary on the optical axis direction. The second lens group GR2 is moved away from the first lens group GR1. The fourth lens group GR4 is moved towards the third lens group GR3. The fifth lens group GR5 is moved away from the sixth lens group GR6. The movement of the second lens group GR2 provides the greatest zoom effect. A shift of the image plane IMG due to the zooming is corrected by the movement of the fourth lens group GR4.

Focusing is performed by moving the fourth lens group GR4 towards the object side, or by moving the fifth lens group GR5 towards the image side. Focusing may also be performed by moving both the fourth lens group GR4 and the fifth lens group GR5.

When hand shake occurs, the sixth lens group GR6 performs so-called hand-shake compensation by moving in the direction perpendicular to the optical axis to cancel a shift of an image due to the hand shake.

The first lens group GR1 includes, in sequence from the object side to the image side along the optical axis, a negative lens L1, a prism L2 having a reflecting surface for bending the optical axis by 90 degrees, a first positive lens L3, and a second positive lens L4. The surfaces of the first positive lens L3 are aspheric. The second lens group GR2 includes, in sequence from the object side to the image side along the optical axis, a first negative lens L5, a cemented lens including a negative lens L6 and a positive lens L7, and a second negative lens L8. The third lens group GR3 includes a single positive lens L9, the surfaces of which are aspheric, and the aperture stop IR positioned adjacent to the image side of the positive lens L9. The fourth lens group GR4 includes, in sequence from the object side to the image side along the optical axis, a cemented lens including a positive lens L10 having an aspheric surface on the object side and a negative lens L11. The fifth lens group GR5 includes a single negative lens L12. The sixth lens group GR6 includes a single positive lens having an aspheric surface on the object side.

Table 1 shows lens data of the zoom lens 1 according to the first numerical example, in which numerical values are applied to the zoom lens 1 according to the first embodiment. In Table 1 and other tables, "ri" represents the radius of curvature of the i-th lens surface from the object side; "di" represents the distance along the optical axis between the i-th lens surface and the i+1-th lens surface from the object side; "ni" represents the index of refraction of the i-th lens surface from the object side with respect to the D-line, the wavelength of which is 587.56 nm; "vi" represents the Abbe number of the i-th lens surface from the object side with respect to the D-line; "f" represents the focal length of the entire lens system; "Fno" represents the full-aperture F value; and "ω" represents half of the angle of view. "INF" under the column "ri" (the radius of curvature) indicates that the i-th lens surface from the object side is flat, and "variable" under the column "di" (the distance along the optical axis) indicates that the distance along the optical axis between the i-th lens surface and the i+1-th lens surface from the object side is variable.

TABLE 1

| i | ri | di | ni | vi |
|---|---|---|---|---|
| 1 | 5.044 | 0.130 | 1.92286 | 20.9 |
| 2 | 2.170 | 0.483 | | |
| 3 | INF | 1.531 | 1.90366 | 31.3 |
| 4 | INF | 0.033 | | |
| 5 | 3.433 | 0.371 | 1.69350 | 53.2 |
| 6 | −8.825 | 0.033 | | |
| 7 | 3.328 | 0.308 | 1.49700 | 81.6 |
| 8 | −10.487 | variable | | |
| 9 | 1400.330 | 0.072 | 1.90366 | 31.3 |
| 10 | 1.230 | 0.193 | | |
| 11 | −4.156 | 0.067 | 1.72916 | 54.7 |
| 12 | 0.984 | 0.203 | 1.92286 | 20.9 |
| 13 | −4.105 | 0.072 | | |
| 14 | −1.720 | 0.072 | 1.84666 | 23.8 |
| 15 | 7.600 | variable | | |
| 16 | 2.447 | 0.215 | 1.58313 | 59.5 |
| 17 | −12.001 | 0.033 | | |
| 18 | INF | variable | | |
| 19 | 1.903 | 0.371 | 1.58313 | 59.5 |
| 20 | −0.917 | 0.072 | 1.80610 | 33.3 |
| 21 | −1.556 | variable | | |
| 22 | −6.974 | 0.072 | 2.00060 | 25.5 |
| 23 | 1.510 | variable | | |
| 24 | 1.553 | 0.320 | 1.48749 | 70.4 |
| 25 | −6.856 | 0.499 | | |
| 26 | INF | 0.050 | 1.51680 | 64.2 |
| 27 | INF | 0.391 | | |
| 28 | INF | 0.083 | 1.55671 | 58.6 |
| 29 | INF | 0.100 | | |
| 30 | INF | 0.000 | | |

When the zoom lens 1 zooms, a distance d8 between the first lens group GR1 and the second lens group GR2, a distance d15 between the second lens group GR2 and the third lens group GR3, a distance d18 between the third lens group GR3 and the fourth lens group GR4, a distance d21 between the fourth lens group GR4 and the fifth lens group GR5, and a distance d23 between the fifth lens group GR5 and the sixth lens group GR6 change. Table 2 shows values of the distances d8 to d23 in the case of the lens 1 according to the first numerical example being at the wide angle end (f=1.00), the middle focal length (standard) (f=3.16), and the telephoto end (f=10.00).

TABLE 2

| | f | | |
|---|---|---|---|
| | 1.00 | 3.16 | 10.00 |
| d8 | 0.09 | 1.00 | 1.52 |
| d15 | 1.52 | 0.61 | 0.09 |
| d18 | 2.15 | 1.39 | 0.37 |
| d21 | 0.93 | 1.21 | 1.35 |
| d23 | 0.27 | 0.74 | 1.63 |

In the zoom lens 1, surfaces r5 and r6 of the first positive lens L3 of the first lens group GR1, surfaces r16 and r17 of the positive lens L9 of the third lens group GR3, a surface r19 of the fourth lens group GR4 most adjacent to the object side, and a surface r24 of the sixth lens group GR6 adjacent to the object side are aspheric. Table 3 shows fourth-, sixth-, eighth-, and tenth-order aspheric coefficients, denoted by A4, A6, A8, and A10, respectively, of the surfaces r5 to r24 of the zoom lens 1 according to the first numerical example. In Table 3, "E-i" represents an exponential function in which the base is 10, i.e., "$10^{-i}$". For example, "0.12345E-05" represents "$0.12345 \times 10^{-5}$".

TABLE 3

|  | A4 | A6 | A8 | A10 |
|---|---|---|---|---|
| r5 | −1.3404E−02 | 9.5079E−03 | −9.0850E−03 | 3.3926E−03 |
| r6 | −1.1616E−02 | 1.0392E−02 | −9.5378E−03 | 3.5297E−03 |
| r16 | 5.7415E−02 | 1.0849E−01 | 1.4397E−01 | 1.9766E−01 |
| r17 | 9.3268E−02 | 1.2825E−01 | 1.1681E−01 | 4.0412E−01 |
| r19 | −5.3911E−02 | 1.1819E−02 | 2.2487E−02 | 1.1698E−02 |
| r24 | −3.3671E−02 | −2.0362E−02 | 4.5140E−03 | 0.0000E+00 |

Table 4 shows values of "Fno" (the full-aperture F value) and "ω" (half of the angle of view) in the case of the zoom lens 1 according to the first numerical example being at the wide angle end (f=1.00), the middle focal length (standard) (f=3.16), and the telephoto end (f=10.00).

TABLE 4

|  | f | | |
|---|---|---|---|
|  | 1.00 | 3.16 | 10.00 |
| ω (°) | 32.2 | 12.5 | 4.8 |
| Fno | 3.30 | 4.00 | 5.80 |

Figure 2:
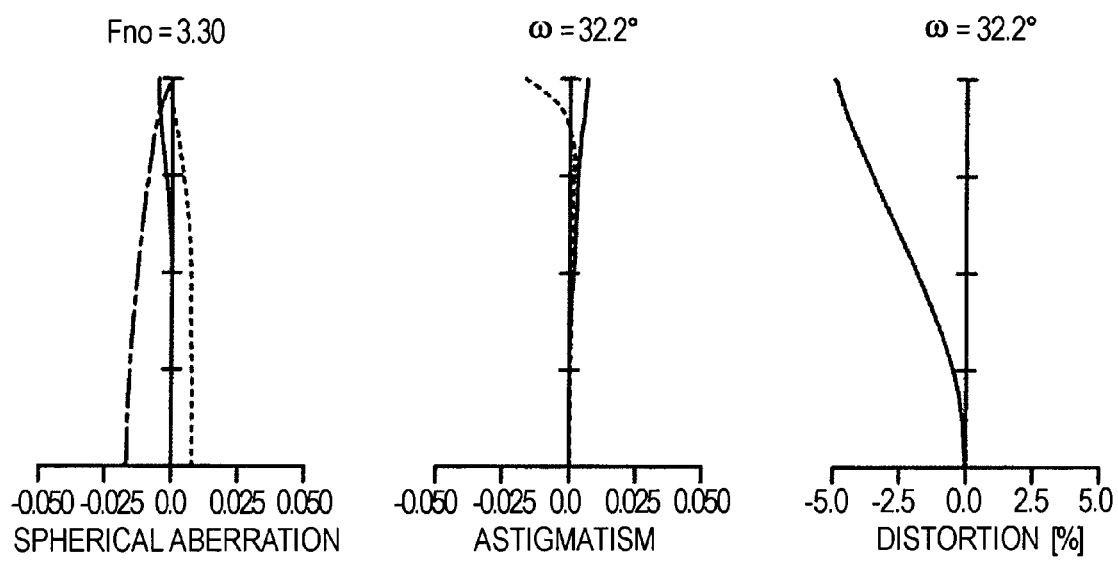
FIG. 2 shows a spherical aberration diagram, astigmatism diagram, and distortion diagram of the zoom lens in the case of the zoom lens being at the wide angle end.
Figure 3:
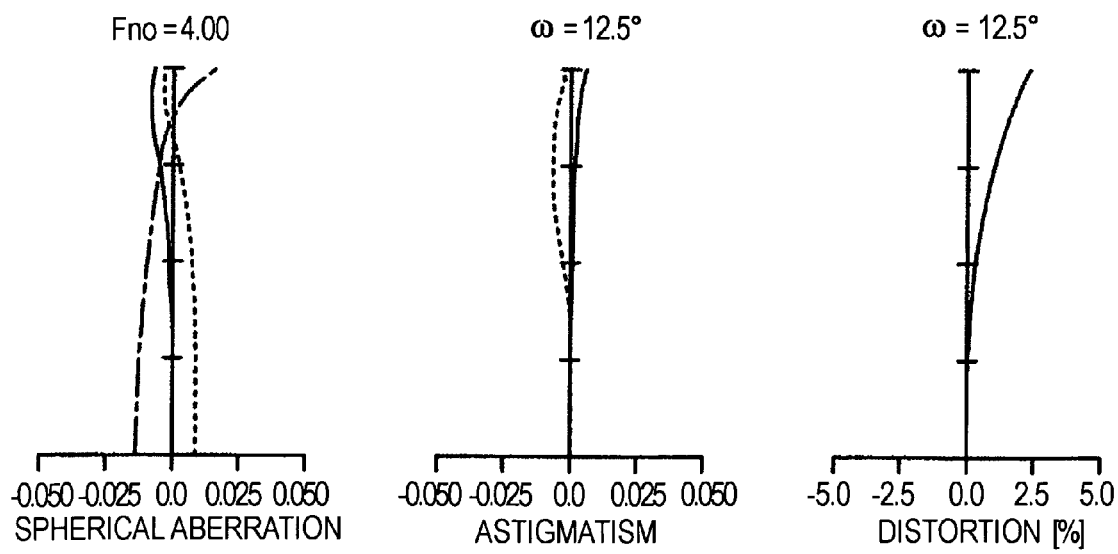
FIG. 3 shows a spherical aberration diagram, astigmatism diagram, and distortion diagram of the zoom lens in the case of the zoom lens being at the middle focal length.
Figure 4:
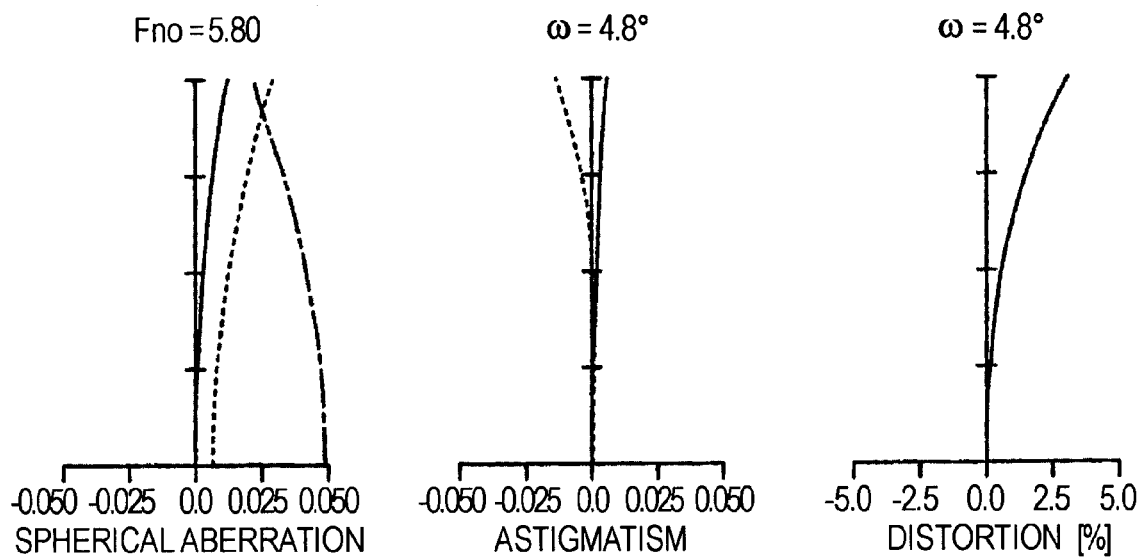
FIG. 4 shows a spherical aberration diagram, astigmatism diagram, and distortion diagram of the zoom lens in the case of the zoom lens being at the telephoto end.

FIGS. 2 to 4 each show a spherical aberration diagram, astigmatism diagram, and distortion diagram of the zoom lens 1 according to the first numerical example. FIG. 2 shows the diagrams in the case of the zoom lens 1 being at the wide angle end (f=1.00). FIG. 3 shows the diagrams in the case of the zoom lens 1 being at the middle focal length (standard) (f=3.16). FIG. 4 shows the diagrams in the case of the zoom lens 1 being at the telephoto end (f=10.00). In the spherical aberration diagrams, the solid lines indicate the spherical aberrations with respect to the D-line, the dashed lines indicate the spherical aberrations with respect to the C-line, the wavelength of which is 656.3 nm, and the alternate long and short dash lines indicate the spherical aberrations with respect to the G-line, the wavelength of which is 435.8 nm. In the astigmatism diagrams, the solid lines indicate the astigmatisms with respect to the D-line on the saggital image plane, the dashed lines indicate the astigmatisms with respect to the D-line on the meridional image plane, and in the distortion diagrams, the solid lines indicate the distortions with respect to the D-line.

As can be seen from FIGS. 2 to 4, the zoom lens 1 according to the first numerical example has a zoom ratio of substantially 10×, and exhibits an excellent optical performance at all the focal lengths.

Now, an imaging device according to an embodiment of the present invention will be described.

The imaging device according to the embodiment of the present invention includes a zoom lens, and an imaging element for converting an optical image created by the zoom lens into an electric signal. The zoom lens includes, in sequence from an object side to an image side along an optical axis, a first lens group having a positive refracting power, a second lens group having a negative refracting power, a third lens group having a positive refracting power, a fourth lens group having a positive refracting power, a fifth lens group having a negative refracting power, and a sixth lens group having a positive refracting power. The first lens group includes a reflecting member for bending the optical axis by substantially 90 degrees. The first and third lens groups remain stationary on the optical axis when the zoom lens zooms or focuses. Zooming is performed by moving the second, fourth, and fifth lens groups along the optical axis. Focusing is performed by moving the fourth lens group and/or the fifth lens group along the optical axis. Image shift is performed by moving the sixth lens group in a direction substantially perpendicular to the optical axis. The fourth lens group includes a single positive lens and a single negative lens.

Accordingly, the imaging device according to the embodiment of the present invention can be made compact, while having a high zoom ratio of at least 5×.

Figure 5:
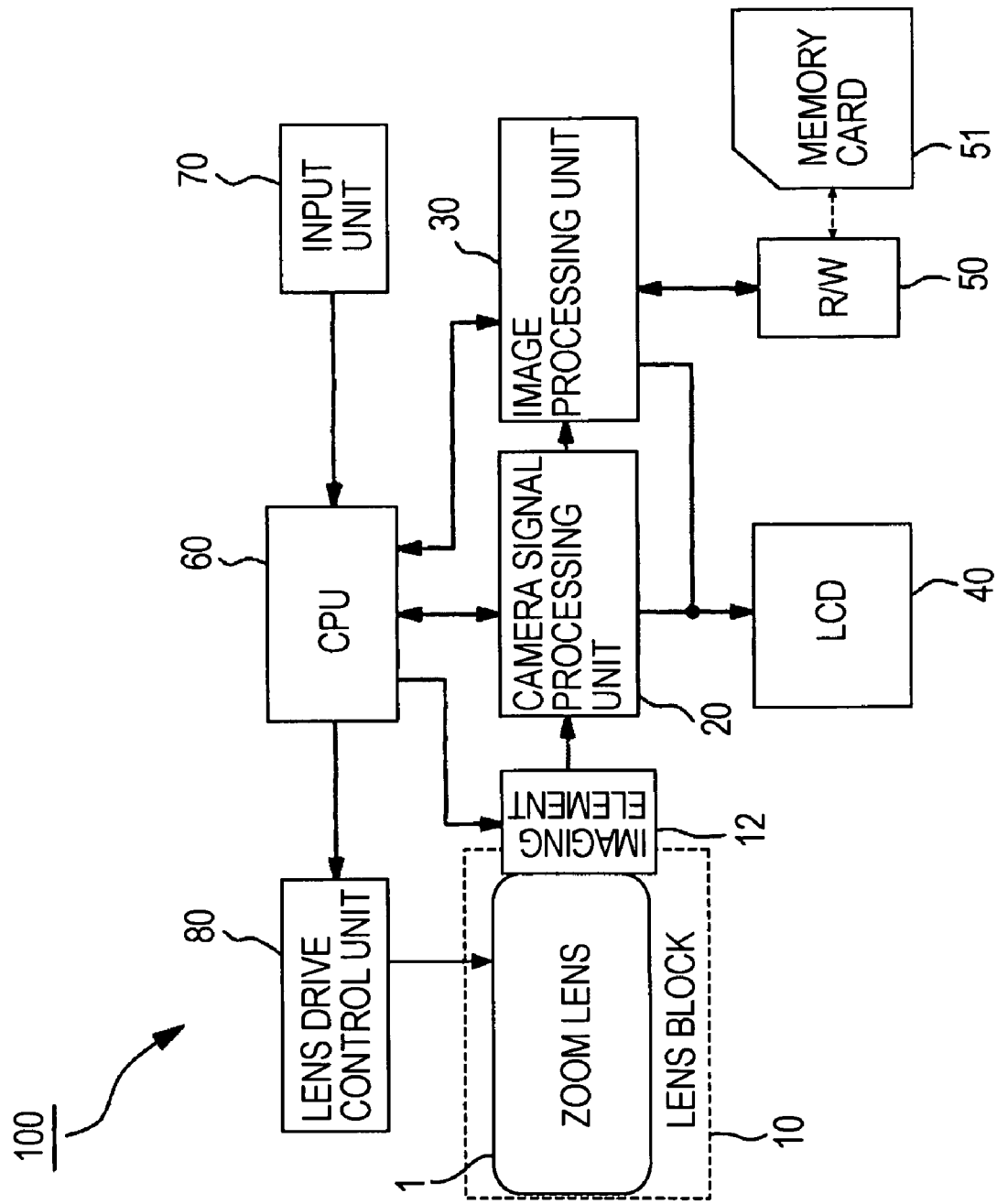
FIG. 5 is a block diagram of an exemplary structure of a digital still camera that uses the zoom lens according to the first embodiment of the present invention.

FIG. 5 is a block diagram of an exemplary structure of a digital still camera that uses the zoom lens according to the first embodiment of the present invention.

A digital still camera 100 includes a lens block 10 for capturing images, a camera signal processing unit 20 for performing signal processing, such as analog-to-digital conversion of image signals of the captured images, an image processing unit 30 for performing recording-and-reproducing processing of the image signals, a liquid-crystal display (LCD) 40 for displaying the captured images, a reader/writer (R/W) 50 for performing reading/writing operations from/into a memory card 51, a central processing unit (CPU) 60 for controlling the entire device, an input unit 70 for allowing a user to input instructions, and a lens drive control unit 80 for controlling the driving of the lenses in the lens block 10.

The lens block 10 includes an optical system including the zoom lens 1 according to an embodiment of the present invention, and an imaging element 12 such as a charge-coupled device (CCD). The camera signal processing unit 20 performs signal processing, such as analog-to-digital conversion, noise rejection, image quality correction, and conversion into brightness and color-difference signals, on the signals output from the imaging element 12. The image processing unit 30 performs compression and encoding, expansion and decoding, and conversion of the data specification such as the resolution, of the image signals according to a predetermined image data format. Examples of the zoom lens 1 include, besides the zoom lens 1 according to the above-described first embodiment and the first numerical example, a zoom lens according to other embodiments of the present invention.

The memory card 51 includes a removable semiconductor memory. The reader/writer 50 writes the image data encoded by the image processing unit 30 into the memory card 51, and reads the image data recorded in the memory card 51. The CPU 60 is a control processing unit for controlling circuit blocks in the digital still camera, and controls the circuit blocks according to instruction-input signals from the input unit 70, or the like.

The input unit 70 includes, for example, a shutter release button for operating the shutter, and a mode selection switch for selecting an operation mode. The input unit 70 outputs the instruction-input signals according to the user's operation to the CPU 60. The lens drive control unit 80 controls a motor (not shown) or the like for driving lenses in the zoom lens 1 according to control signals from the CPU 60.

Operation of the digital still camera 100 will now be briefly described.

When the digital still camera 100 is in the stand-by state, under the control of the CPU 60, an image signal of an image captured by the lens block 10 is output through the camera signal processing unit 20 to the LCD 40, where the image is displayed as a camera-through image. When the CPU 60 receives an instruction-input signal instructing zooming of the zoom lens 1 from the input unit 70, the CPU 60 outputs a control signal to the lens drive control unit 80. Then, under the control of the lens drive control unit 80, predetermined lenses in the zoom lens 1 are moved.

When the shutter (not shown) in the lens block 10 is released according to an instruction-input signal from the input unit 70, an image signal of a captured image is output from the camera signal processing unit 20 to the image processing unit 30, where the image signal is compressed and encoded to be converted into digital data of a predetermined data format. The converted data is output to the reader/writer 50, where the data is written into the memory card 51.

When, for example, the shutter release button is pressed halfway, or fully pressed for recording, the lens drive control unit 80 moves predetermined lenses in the zoom lens 1 according to a control signal from the CPU 60 and performs focusing.

To reproduce image data recorded in the memory card 51, the reader/writer 50 reads predetermined image data from the memory card 51 in response to operation of the input unit 70. The image data is then expanded and decoded by the image processing unit 30, from where a reproduction image signal is output to the LCD 40. Then, a reproduced image is displayed.

When an image blur due to hand shake or the like occurs, a detection unit (not shown) detects it. Then, the lens drive control unit 80 causes a hand-shake compensation lens to move in a direction canceling the image blur by a predetermined amount. In the case of the above-described zoom lens 1, the lens drive control unit 80 causes the sixth lens group GR6 to move in a predetermined direction, i.e., a direction substantially perpendicular to the optical axis, by a predetermined amount.

Figure 6:
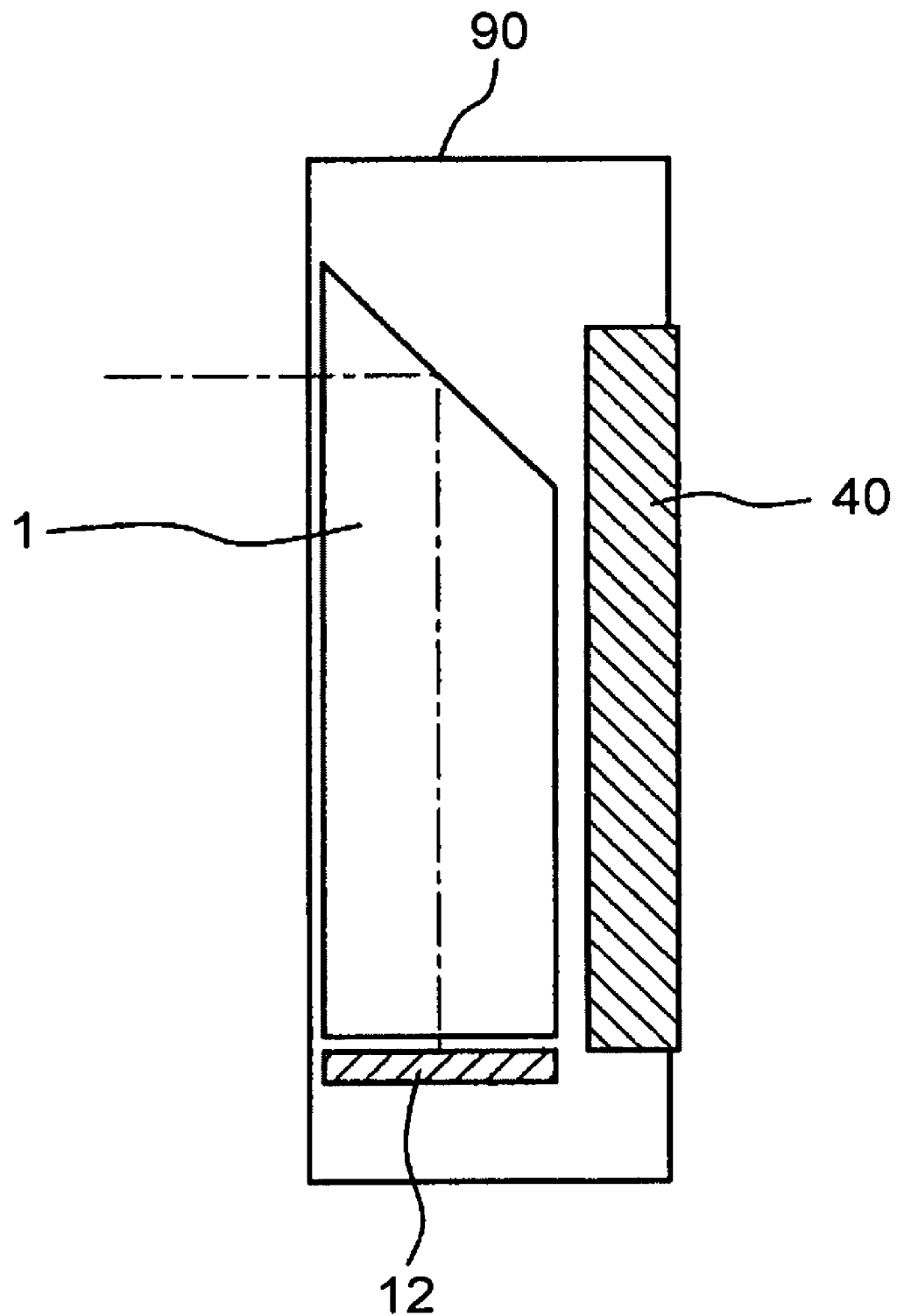
FIG. 6 is a schematic sectional view showing an exemplary arrangement of components in a digital still camera.

FIG. 6 is a schematic sectional view showing an exemplary arrangement of the components in the digital still camera 100. FIG. 6 shows the interior of the digital still camera 100 facing a subject positioned on the left-hand side thereof.

The zoom lens 1 is housed in a camera body 90, and the imaging element 12 is arranged under the zoom lens 1. The LCD 40 is provided on the surface of the camera body 90 facing a photographer, so that the photographer can use the LCD 40 to adjust the angle of view during taking pictures, to reproduce images, to confirm information of settings, or the like.

The zoom lens 1 according to the first embodiment of the present invention bends the optical axis of the light coming from a subject with a prism. By moving predetermined lenses along the direction of the bent light (the vertical direction in FIG. 6, and the horizontal direction in FIG. 1), zooming and focusing may be performed. This allows the digital still camera 100 to take pictures without projecting the zoom lens 1 from the camera body 90, whereby the thickness of the camera body 90 during taking pictures can be reduced. In addition, the zoom lens 1 designed to meet the above-described conditions allows for a further reduction in size of the camera body 90. Accordingly, a compact digital still camera with a zoom lens having a high zoom ratio of larger than 5× and capable of capturing high-quality images with little aberration at all the focal lengths can be provided.

In the above-described embodiment, the imaging device of the present invention is applied to a digital still camera. However, the imaging device of the present invention may be applied to other imaging devices, such as video cameras.

The shapes of the components and numerical values provided in the foregoing embodiments and the numerical example are by way of example only, and are not intended as limiting the technical scope of the present invention.

It should be understood by those skilled in the art that various modifications, combinations, sub-combinations and alterations may occur depending on design requirements and other factors insofar as they are within the scope of the appended claims or the equivalents thereof.

What is claimed is:

1. A zoom lens comprising, in sequence from an object side to an image side along an optical axis:
   a first lens group having a positive refracting power;
   a second lens group having a negative refracting power;
   a third lens group having a positive refracting power;
   a fourth lens group having a positive refracting power;
   a fifth lens group having a negative refracting power; and
   a sixth lens group having a positive refracting power,
   wherein the first lens group includes a reflecting member for bending the optical axis by substantially 90 degrees,
   wherein the first and third lens groups remain stationary on the optical axis when the zoom lens zooms or focuses,
   wherein zooming is performed by moving the second, fourth, and fifth lens groups along the optical axis,
   wherein focusing is performed by moving the fourth lens group and/or the fifth lens group along the optical axis,
   wherein image shift is performed by moving the sixth lens group in a direction substantially perpendicular to the optical axis, and
   wherein the fourth lens group includes a single positive lens and a single negative lens.

2. The zoom lens according to claim 1,
   wherein the first lens group includes, in sequence from the object side to the image side along the optical axis, a negative lens, a prism having a reflecting surface for bending the optical axis by 90 degrees, a first positive lens, and a second positive lens, and
   wherein at least one of the first and second positive lenses is an aspheric lens.

3. The zoom lens according to claim 1,
   wherein the second lens group includes, in sequence from the object side to the image side along the optical axis, a first negative lens, a cemented lens including a negative lens and a positive lens, and a second negative lens.

4. The zoom lens according to claim 1,
   wherein the third lens group includes an aperture stop and a single positive lens disposed adjacent to the aperture stop.

5. The zoom lens according to claim 1,
   wherein the fourth lens group includes a cemented lens including a positive lens and a negative lens.

6. The zoom lens according to claim 1,
   wherein the fifth lens group includes a single negative lens.

7. The zoom lens according to claim 1,
   wherein the sixth lens group includes a single positive lens.

8. An imaging device comprising:
   a zoom lens; and
   an imaging element for converting an optical image created by the zoom lens into an electric signal,
   wherein the zoom lens includes, in sequence from an object side to an image side along an optical axis, a first lens group having a positive refracting power, a second lens group having a negative refracting power, a third lens group having a positive refracting power, a fourth lens group having a positive refracting power, a fifth lens group having a negative refracting power, and a sixth lens group having a positive refracting power,
   wherein the first lens group includes a reflecting member for bending the optical axis by substantially 90 degrees,
   wherein the first and third lens groups remain stationary on the optical axis when the zoom lens zooms or focuses,
   wherein zooming is performed by moving the second, fourth, and fifth lens groups along the optical axis,
   wherein focusing is performed by moving the fourth lens group and/or the fifth lens group along the optical axis,
   wherein image shift is performed by moving the sixth lens group in a direction substantially perpendicular to the optical axis, and
   wherein the fourth lens group includes a single positive lens and a single negative lens.

* * * * *